US012512987B2

(12) United States Patent
Michaels et al.

(10) Patent No.: US 12,512,987 B2
(45) Date of Patent: Dec. 30, 2025

(54) DATA WATERMARKING

(71) Applicant: Ford Global Technologies, LLC, Dearborn, MI (US)

(72) Inventors: Alan J. Michaels, Blacksburg, VA (US); Venkata N. Sai Srikar Palukuru, Canton, MI (US); John Moore, Canton, MI (US); Michael Fletcher, Roanoke, VA (US); Christopher Henshaw, Christiansburg, VA (US)

(73) Assignee: Ford Global Technologies, LLC, Dearborn, MI (US)

( * ) Notice: Subject to any disclaimer, the term of this patent is extended or adjusted under 35 U.S.C. 154(b) by 128 days.

(21) Appl. No.: 18/340,155

(22) Filed: Jun. 23, 2023

(65) Prior Publication Data

US 2024/0430088 A1 Dec. 26, 2024

(51) Int. Cl.
*H04L 9/32* (2006.01)
(52) U.S. Cl.
CPC ..................................... *H04L 9/32* (2013.01)
(58) Field of Classification Search
CPC ... H04L 9/32; H04L 2209/805; H04L 9/3226; H04L 2209/84; H04L 63/12; H04W 12/06; H04W 12/106; H04B 1/69
See application file for complete search history.

(56) References Cited

U.S. PATENT DOCUMENTS

| 11,183,198 B2 | 11/2021 | Filler et al. | |
| 11,354,532 B1 * | 6/2022 | Stancil | G06V 20/40 |
| 12,094,474 B1 * | 9/2024 | Gowal | G10L 21/0232 |
| 2003/0221106 A1 * | 11/2003 | Delp | G06T 1/0064 |
| | | | 348/E5.009 |
| 2011/0184580 A1 * | 7/2011 | Kawamoto | H02J 3/14 |
| | | | 700/295 |
| 2011/0216936 A1 * | 9/2011 | Reed | G06T 1/0021 |
| | | | 382/100 |
| 2017/0025129 A1 * | 1/2017 | Blesser | G10L 19/018 |

(Continued)

FOREIGN PATENT DOCUMENTS

| CN | 111404925 A | 7/2020 |
| CN | 114205133 A | 3/2022 |

OTHER PUBLICATIONS

Tang, J., "Cybersecurity for Networked Control System," Graduate Program in Electrical and Computer Engineering, The Ohio State University, 2022, 125 pages.

*Primary Examiner* — Abiy Getachew
(74) *Attorney, Agent, or Firm* — Christopher Storms; Brooks Kushman P.C.

(57) ABSTRACT

A computer includes a processor and a memory, the memory stores instructions executable by the processor to generate first and second messages for transmission via a communications bus via a first modulation mode and to generate first and second watermarking signals for transmission on the communications bus via a second modulation mode, in which the first and second modulation modes are isolated from each other. The instructions may additionally be to transmit the first message overlaid by the first watermarking signal and to transmit the second message overlaid by the second watermarking signal, the second watermarking signal having a parameter that varies from the first watermarking signal.

19 Claims, 7 Drawing Sheets

(56) References Cited

U.S. PATENT DOCUMENTS

| | | | |
|---|---|---|---|
| 2018/0357742 A1* | 12/2018 | Henry | H04N 21/8358 |
| 2019/0027049 A1* | 1/2019 | Sinkiewicz | G08G 5/723 |
| 2020/0003894 A1* | 1/2020 | Giancristofaro | G01S 13/90 |
| 2022/0321349 A1 | 10/2022 | Michaels et al. | |
| 2023/0089054 A1* | 3/2023 | Gurelli | G01S 5/0273 |
| | | | 342/378 |

* cited by examiner

DATA WATERMARKING

BACKGROUND

A variety of systems utilize internal communications links to exchange data, parameters, settings, etc. among system components. For example, in a vehicle system, internal communications links, such as provided by a vehicle communications bus, may be utilized to transfer data from various vehicle sensors to a vehicle computer. The vehicle computer may then execute programming to detect and/or recognize objects present in a driving environment. A vehicle communications bus can transfer other types of data, such as personally identifiable information of an operator, contact information uploaded from an operator's mobile communications device, parameters utilized by vehicle facial recognition applications, etc.

DETAILED DESCRIPTION

Figure 1:
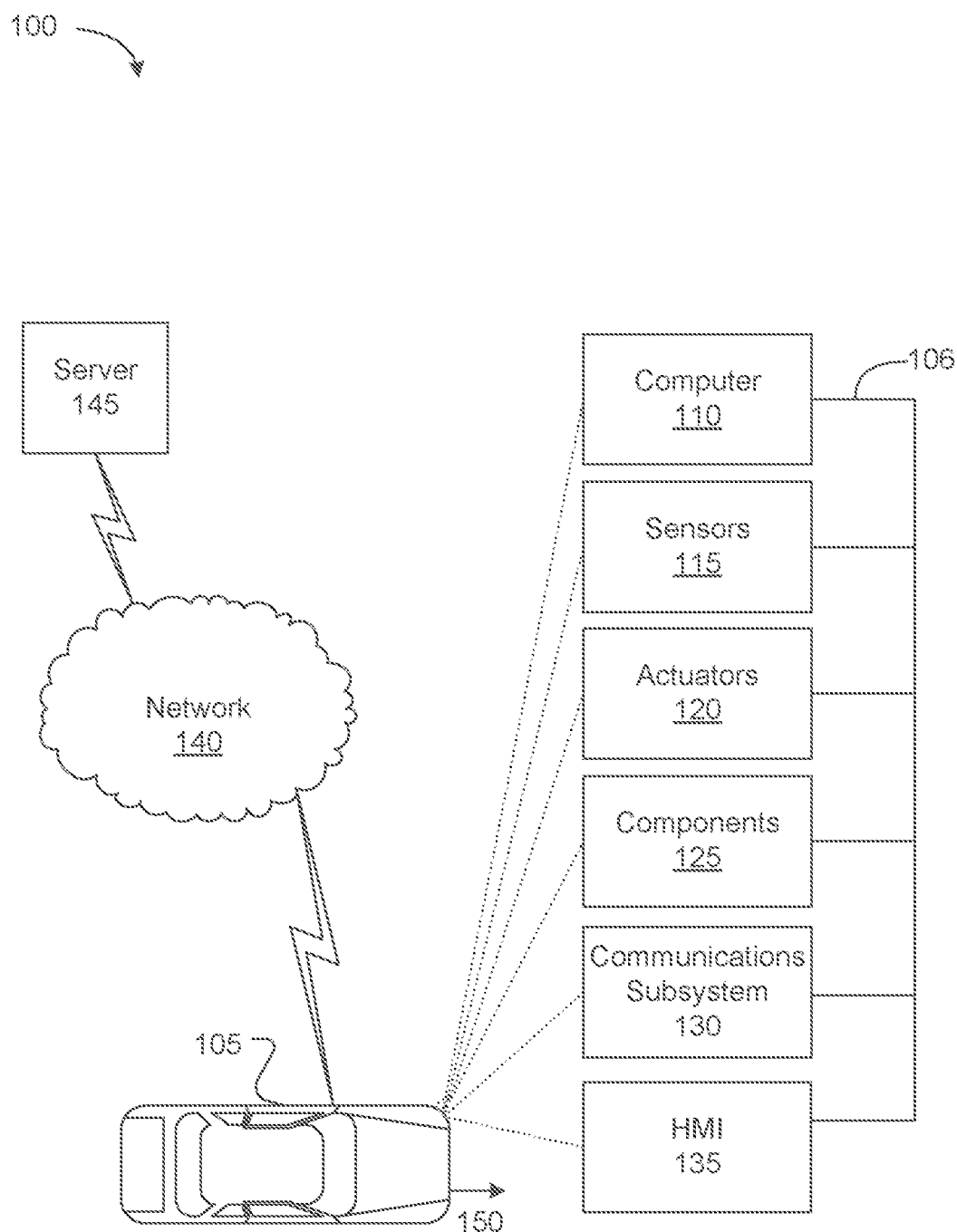
FIG. 1 is a block diagram of an example vehicle system having internal and external communications links.

This disclosure provides techniques for providing watermarking of sensitive or potentially sensitive data generated by onboard vehicle sensors, computers, communication subsystems, etc. As the term is used herein, a "watermark" means signal that is overlaid onto a data message to provide authenticity to the data message. Thus, for example, a first message which may be modulated utilizing a first modulation mode and which may include sensitive or potentially sensitive content, may be watermarked utilizing the signal modulated using a second modulation mode. Examples of sensitive or potentially sensitive data generated by onboard vehicle sensors may include objects detected and/or classified via radar sensors, ultrasonic sensors, cameras, LIDAR devices, etc. Other types of sensitive or potentially sensitive data can include the vehicle's present location and current motion parameters, credentials utilized by the vehicle's computer to permit an operator to enter and/or operate the vehicle, data uploaded from a mobile communications device belonging to a passenger or an operator of the vehicle, etc. Such data may be transferred or exchanged among various vehicle subsystems utilizing a vehicle communications bus. To preclude insertion of false data, which could be used to gain illegitimate access to the vehicle, direct operations of the vehicle, or to bring about disclosure of information that is private to operators and/or passengers of the vehicle, sensitive or potentially sensitive data may be watermarked. Watermarking of data communications, which can be achieved by overlaying a watermarking signal onto a data message transmitted to a vehicle communications bus utilizing techniques described herein, can operate to authenticate the data message or convey additional data. At a receiving end, a receiving device can isolate data messages from the watermarking signal. A received watermarking signal can be processed to determine whether the composite signal includes an expected watermarking signal. In response to the received watermarking signal including a watermarking signal, the data message can be authenticated. In response to a received watermarking signal not including a predetermined watermarking signal, the data message can be discarded as being false or illegitimate.

In an example, overlaying of a watermark signal utilizing a second modulation mode may not be time-synchronized or time-coincident with transmission of a first message conveyed utilizing a first modulation mode. Thus, for example, a watermarking signal can be a preamble utilizing a second modulation mode transmitted prior to transmission of a data message that include sensitive or potentially sensitive content. In another example, a watermarking signal can be transmitted after a data message, so as to authenticate a previously-transmitted data message. Further, a watermarking signal can be utilized to convey additional data, such as metadata, which may include parameters describing the source of a data message, a credential of the data message, a length of a data message, etc.

A system for watermarking of data communications can include a computer having a processor coupled to a memory, the memory storing instructions executable by the processor to generate first and second messages for transmission via a communications bus via a first modulation mode. The instructions can additionally be to generate first and second watermarking signals for transmission on the communications bus via a second modulation mode, the first and second modulation modes being isolated from each other. The instructions can additionally be to transmit the first message overlaid by the first watermarking signal and to transmit the second message overlaid by the second watermarking signal, the second watermarking signal having one or more parameter(s) that varies from the first watermarking signal.

The first modulation mode can include a differential mode.

The second modulation mode can include a common mode.

The first and second watermarking signals can be modulated via a spread-spectrum technique.

The parameter can be based on a ratio of a spreading code rate to a data rate of a spread-spectrum signal.

The parameter can be an integer value of a ratio of a spreading code rate to a data rate of a spread-spectrum signal.

The parameter can be a phase shift of a spreading code of a spread-spectrum signal. The parameter can be a length of the second watermarking signal.

The parameter can be a code rate of a spread-spectrum modulation mode.

The parameter can be an up-conversion factor of a spreading code of a spread-spectrum modulation mode.

The parameter can be an amplitude of a spreading code of a spread-spectrum modulation mode.

The instructions can be further to determine the parameter based on content of the second message.

The instructions can be further to determine the parameter based on a recipient of the second message.

The instructions can be further to determine the parameter based on detected noise on a conductor of the communications bus.

The first watermarking signal or the second watermarking signal can extend beyond the interval during which the first message or the second message are transmitted.

The first watermarking signal or the second watermarking signal can terminate prior to completion of transmission of the first message of the second message.

A method for watermarking data communications can include generating first and second messages for transmission via a communications bus via a first modulation mode and generating first and second watermarking signals for transmission on the communications bus via a second modulation mode, the first and second modulation modes being isolated from each other. The method can additionally include transmitting the first message overlaid by the first watermarking signal the method can additionally include transmitting the second message overlaid by the second watermarking signal, the second watermarking signal having a parameter that varies from the first watermarking signal.

The method can further include detecting interference on one or more conductors of the communications bus and determining the parameter of the second watermarking signal based on the detected interference.

The method can additionally include determining a recipient of the second message and determining the parameter of the second watermarking signal based on the determined recipient.

The method can additionally include determining a message content of the second message and determining the parameter of the second watermarking signal based on the determined second message content.

FIG. 1 is a block diagram of an example vehicle system 100 having internal and external communications links. As seen in FIG. 1, system 100 includes vehicle 105, which can be any vehicle, such as a car, truck, minivan, sport utility vehicle, crossover vehicle, etc. In another example, system 100 includes an aircraft or watercraft. System 100 includes vehicle computer 110, which includes communications links, such as vehicle communications bus 106, to and from various sensors, components, actuators, and subsystems of vehicle 105. Thus, vehicle computer 110 may transfer messages, which may include data, parameters, and/or settings, to sensors 115, actuators 120, vehicle components 125 (e.g., steering, propulsion, and braking), communication subsystem 130, and human machine interface (HMI) 135. Vehicle 105 can additionally communicate with server 145, which may be remotely located from vehicle 105, via wireless communications network 140. Accordingly, vehicle 105 may transmit messages to, and/or receive messages from, other vehicles as vehicle 105 is at rest or traveling in a driving environment along path 150.

Vehicle computer 110 includes a processor and a memory. A memory of vehicle computer 110, such as those described herein, includes one or more forms of computer-readable media, and stores instructions executable by vehicle computer 110 for performing various operations including those disclosed herein. For example, vehicle computer 110 can be a generic computer with a processor and memory as described above and/or may include an electronic control unit (ECU) or a controller for a specific function or set of functions, and/or may include a dedicated electronic circuit including an application-specific integrated circuit (ASIC) that is manufactured for a particular operation, e.g., an ASIC for processing data from sensors 115 and/or communicating data from sensors 115. In another example, vehicle computer 110 may include an FPGA (Field-Programmable Gate Array), which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in vehicle computer 110. Further, vehicle computer 110 may include a plurality of computers onboard vehicle 105, e.g., a plurality of ECUs (electronic control units) or the like, operating together to perform operations ascribed herein to vehicle computer 110. Memory accessed by a processor of vehicle computer 110 can be of any type, e.g., hard disk drives, solid-state drives, or any volatile or non-volatile media. The memory accessed by a processor of vehicle computer 110 can store data collected from sensors 115. Such memory can be a separate device from vehicle computer 110, and vehicle computer 110 can retrieve information stored by the memory utilizing vehicle communications bus 106.

Vehicle computer 110 can include programming in the form of executable instructions, which actuate one or more components 125 such as vehicle brakes, propulsion (e.g., one or more of an internal combustion engine, electric motor, hybrid engine, etc.), steering, climate control, interior and/or exterior lights, etc., as well as to determine whether and when computer 110, as opposed to a human operator, is to control such operations. Additionally, computer 110 may be programmed to determine whether and when a human operator is to control such operations. Computer 110 may include or be communicatively coupled to, e.g., via vehicle communications bus 106, more than one processor, e.g., included in components 125 such as sensors 115, electronic control units (ECUs) or the like included in the vehicle for monitoring and/or controlling various vehicle components, e.g., a powertrain controller, a brake controller, a steering controller, etc.

Computer 110 is generally arranged for communications on vehicle communications bus 106, which can include a communications bus operating within the vehicle, such as a controller area network CAN bus or the like. Vehicle communications bus 106 is a communications network via which messages can be exchanged between various devices, e.g., sensors 115, components 125, computer 110 (s), etc., onboard vehicle 105. Computer 110 can be generally programmed to send and/or receive, via vehicle communications bus 106, messages to and/or from other devices in vehicle 105, e.g., any or all of ECUs, sensors 115, actuators, components 125, communications subsystem 130, HMI 135, etc. For example, various component 125, subsystems (e.g., components 125 can be controlled by respective ECUs) and/or sensors 115 may provide data to computer 110 via communications bus 106. In some implementations, vehicle 105 can include additional networks in which messages are conveyed using other wired communication technologies and/or wireless communication technologies, e.g., Ethernet, wireless fidelity (WiFi®), Bluetooth®, etc. Additional examples of protocols that may be used for communications over vehicle communications bus 106 in some implementations include, without limitation, Media Oriented System Transport (MOST), Time-Triggered Protocol (TTP), and FlexRay. In some implementations, communications among computer 110, sensors 115, actuators 120, components 125, communications subsystem 130, and HMI 135 take place utilizing a combination of multiple networks, possibly of different types, that support communications among devices in a vehicle.

Vehicle 105 typically includes a variety of sensors 115. Sensors 115 may include a device(s) that can obtain one or more measurements of one or more physical phenomena. Some of sensors 115 may detect internal states of the vehicle, for example, wheel speed, wheel orientation, and engine and transmission variables. Some of sensors 115 may operate to detect the position or orientation of the vehicle utilizing, for example, global positioning system GPS sensors; accelerometers, such as piezo-electric or microelectromechanical systems (MEMS); gyroscopes, such as rate, ring laser, or fiber-optic gyroscopes; inertial measurements units (IMUs); and magnetometers. Some of sensors 115 may detect the external world, for example, radar sensors, scanning laser range finders, light detection and ranging (LIDAR) devices, and image processing sensors such as cameras.

Vehicle computer 110 may be configured for communicating through a wireless communication interface with a second vehicle, e.g., via a vehicle-to-vehicle (V2V), a vehicle-to-infrastructure (V-to-I) communication, and/or a vehicle-to-everything (V2X) communication network (i.e., communications that can include V2V and V2I). Some of sensors 115 are communications devices, for example, vehicle-to-infrastructure V2I or V2V devices, which may operate via wireless communications network 140. Communications subsystem 130 represents one or more mechanisms by which vehicle computer 110 of vehicle 105 may communicate with other vehicles, and/or elements of a communications infrastructure and may be one or more of wireless communication mechanisms, including any desired combination of wireless and wired communication mechanisms and any desired network topology (or topologies when a plurality of communication mechanisms are utilized). Exemplary V2X communication protocols include cellular, IEEE 802.11, dedicated short-range communications (DSRC), and/or wide area networks (WAN), including the Internet, providing data communication services. DSRC may have one-way or two-way short-range to medium-range wireless communication channels. A V2X communication network may have multiple channels, each identified by an identifier, e.g., channel number.

Exemplary System Operations

Figure 2:
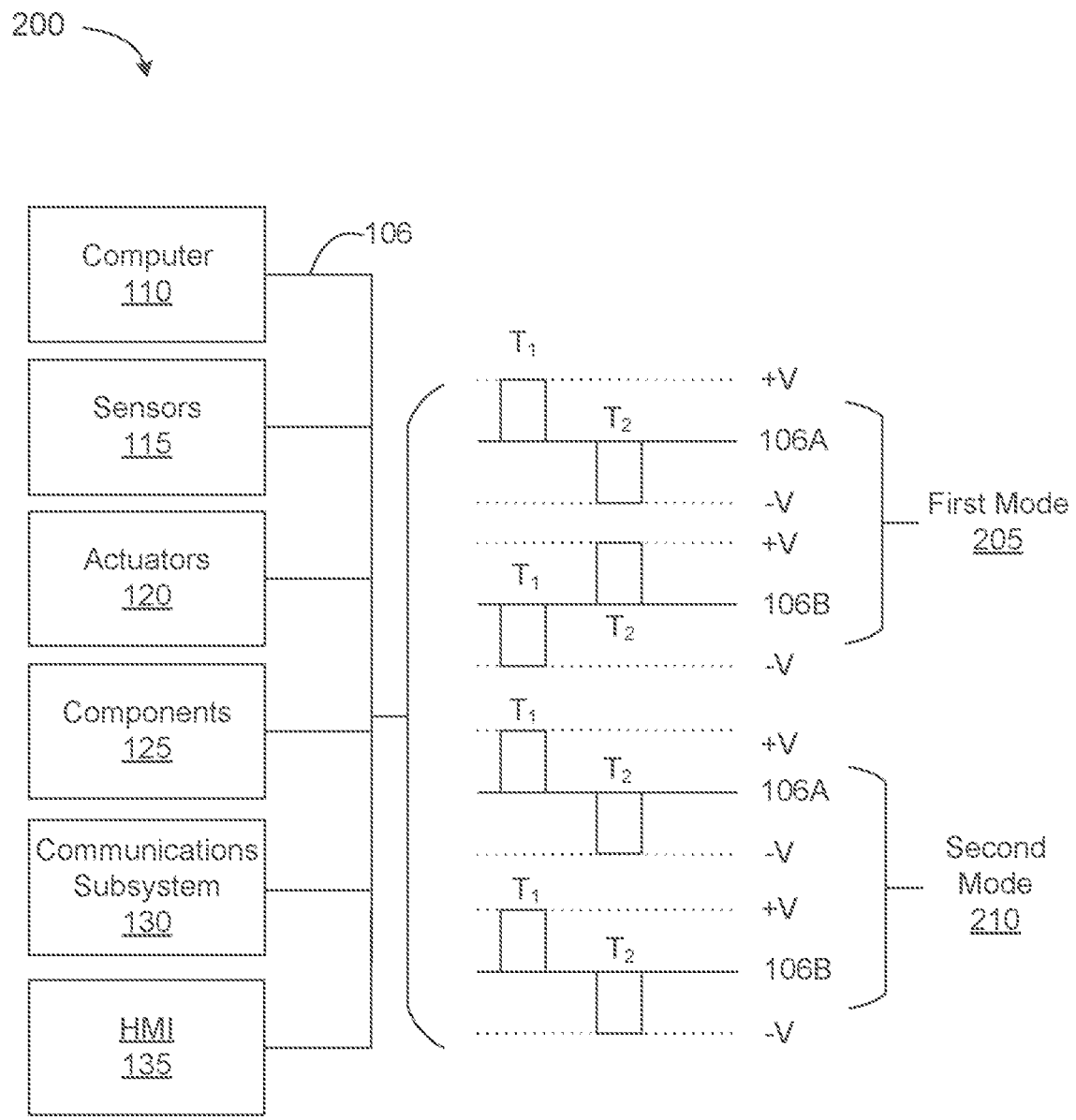
FIG. 2 is a diagram of a vehicle communications bus capable of conveying signals modulated utilizing first and second communication modes.

FIG. 2 is a diagram 200 of a vehicle communications bus capable of conveying signals modulated utilizing first and second communication modes. As described in reference to the example of FIG. 1, vehicle communications bus 106 can include a controller area network (CAN) bus. Vehicle communications bus 106 may utilize two conductors (e.g., conductors 106A and 106B) to transmit messages among computer 110, sensors 115, actuators 120, components 125, communications subsystem 130, and HMI 135. Conductors 106A and 106B may be arranged in a twisted-pair configuration, in which conductors 106A and 106B are twisted about each other. Messages may be transmitted along vehicle communications bus 106 utilizing a first mode 205, which may include a differential mode of communications. In the context of this disclosure, a "differential mode" of communications means a communications mode in which a first conductor (e.g., conductor 106A) is utilized to transmit a signal, e.g., a binary digit, while a second conductor (e.g., conductor 106B) is utilized to transmit a substantially opposite signal. Thus, in the example of FIG. 2, a binary 1 can be represented by transmitting a signal having a positive voltage during time interval $T_1$ with respect to a reference (e.g., a floating ground, a local ground, a vehicle chassis ground, etc.) utilizing conductor 106A. A positive signal transmitted utilizing conductor 106A may be accompanied by transmitting a signal having a negative voltage with respect to the reference, also during time interval $T_1$, utilizing conductor 106B. Further in the example of FIG. 2, a binary 0 can be represented by transmitting a signal having a negative voltage, such as at time interval $T_2$, with respect to a reference utilizing conductor 106A. A signal having a negative voltage may be accompanied by transmitting a signal having a positive voltage, also during time interval $T_2$, utilizing conductor 106B.

At a receiving end, a receiver circuit (e.g., CAN RX component 760) may decode, for example, a binary 1 responsive to conductor 106A exhibiting a positive voltage while conductor 106B exhibits a substantially opposite voltage. At a receiving end, a receiving circuit may decode a binary 0 responsive to conductor 106A exhibiting a negative voltage while conductor 106B exhibits a substantially opposite (positive) voltage. Accordingly, in response to a presence of conducted electromagnetic interference coupled to conductors arranged in a twisted-pair configuration, a receiving circuit may be capable of distinguishing between binary values (e.g., binary 1, binary 0) in a transmitted message since such distinguishing is based on a difference in voltage between conductor 106A and conductor 106B. Further, as a consequence of conductors 106A and 106B simultaneously transmitting a signal and an opposite of the signal, a return conductor (e.g., a reference voltage such as a floating ground, local ground, chassis ground, etc.) is not utilized. Accordingly, electromagnetic interference may be reduced by removing a path for interfering currents, which may conduct utilizing the return (e.g., a reference voltage such as a floating ground, local ground, chassis ground, etc.) conductor.

FIG. 2 additionally shows vehicle communications bus 106 utilizing a second mode 210. Second mode 210 may include a "common mode" of communications among computer 110, sensors 115, actuators 120, components 125, communications subsystem 130, and HMI 135. In the context of this disclosure, a "common mode" of communications means a communications mode in which a first conductor (e.g., conductor 106A) is utilized to transmit a signal while a second conductor (e.g., conductor 106B) is utilized to transmit a substantially similar signal. In the example of FIG. 2, a binary 1 may be transmitted utilizing a positive voltage with respect to a reference at time $T_1$ via a conductor 106A while a signal having a substantially similar level may be transmitted utilizing conductor 106B. In an example, a binary 0 may be transmitted utilizing a negative voltage, with respect to a reference, via conductor 106A while a signal having a substantially similar level may be transmitted utilizing conductor 106B.

At a receiving end, a receiving circuit may decode a binary 1, for example, based on conductors 106A and 106B exhibiting a positive voltage. The receiving circuit may decode a binary 0, for example, based on conductors 106A and 106B exhibiting a negative voltage. Further, responsive to conductor 106A and conductor 106B exhibiting voltages in common with each other (e.g., both positive or both negative), a return conductor (not shown in FIG. 2) may be utilized. Accordingly conducted electromagnetic interference may be introduced into a common mode based on the use of a signal return conductor.

From FIG. 2, it can be seen that vehicle communications bus 106 can employ both differential (e.g., first) and common (e.g., second) modes of communications among computer 110, sensors 115, actuators 120, components 125, communications subsystem 130, and HMI 135. At a transmitting end, vehicle computer 110, for example, may overlay a message transmitted via a common mode (e.g., a second mode) onto a message transmitted via a differential mode (e.g., a first mode). Overlaying of common mode signals (e.g., second mode signals) onto differential mode signals (e.g., first mode signals) can be effected utilizing a summing circuit at a transmit interface of, for example, vehicle computer 110. At a receiving end, a receiver circuit (e.g., CAN RX component 760, watermark comparator 765 of FIG. 7) may utilize circuitry to separate binary digits of messages encoded via a differential (e.g., first) mode from signals encoded via a common (e.g., second) mode by isolating a signal from conductor 106A that is not paired with an opposite signal on a conductor 106B. Similarly, at a receiving end, a receiver circuit may utilize circuitry to separate binary digits of messages encoded via a common (e.g., second) mode from signals encoded via a differential (e.g., first) mode by isolating a signal from conductor 106A that is not paired with a substantially similar signal on conductor 106B. In the context of this disclosure, "isolating," or forms thereof, means separating a first signal from a second signal such that an information content of the first signal does not interfere with or influence the information content of the second signal. Accordingly, vehicle communications bus 106 may utilize differential (e.g., first) and common (e.g., second) mode voltage signals to transfer data while maintaining isolation between the first mode and the second mode.

Figure 3:
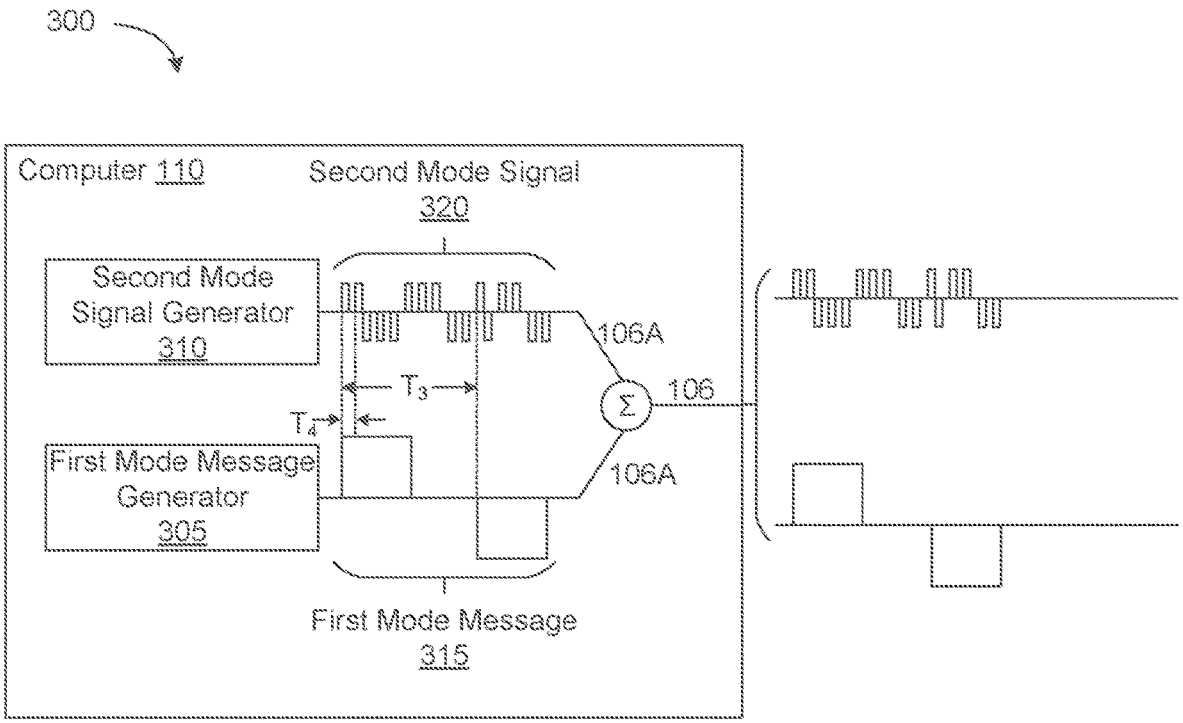
FIGS. 3-4 are diagrams showing watermarking signals and data messages transmitted on a communications bus.

FIG. 3 is a diagram 300 showing programming instructions and/or hardware components vehicle computer 110 generating watermarking and data messages on a conductor (e.g., conductor 106A) of communications bus 106. Although FIG. 3 indicates a voltage signal on conductor 106A, the voltage signal could be indicated on conductor 106B. As seen in FIG. 3, vehicle computer 110 includes first mode message generator 305 for generating first mode message 315. Vehicle computer 110 additionally includes second mode signal generator 310 for generating second mode signal 320. Second mode signal 320 may be utilized as a watermark to authenticate first mode message 315. First mode message generator 305 may include a CAN message generator, e.g., message buffer 730 of FIG. 7, which may be utilized to format data into messages for transfer from vehicle computer 110 such as sensor modes of operation, outputs of data or image processing operations, vehicle position data, data for display via HMI 135 of vehicle 105, or any other data generated by vehicle computer 110.

Figure 7:
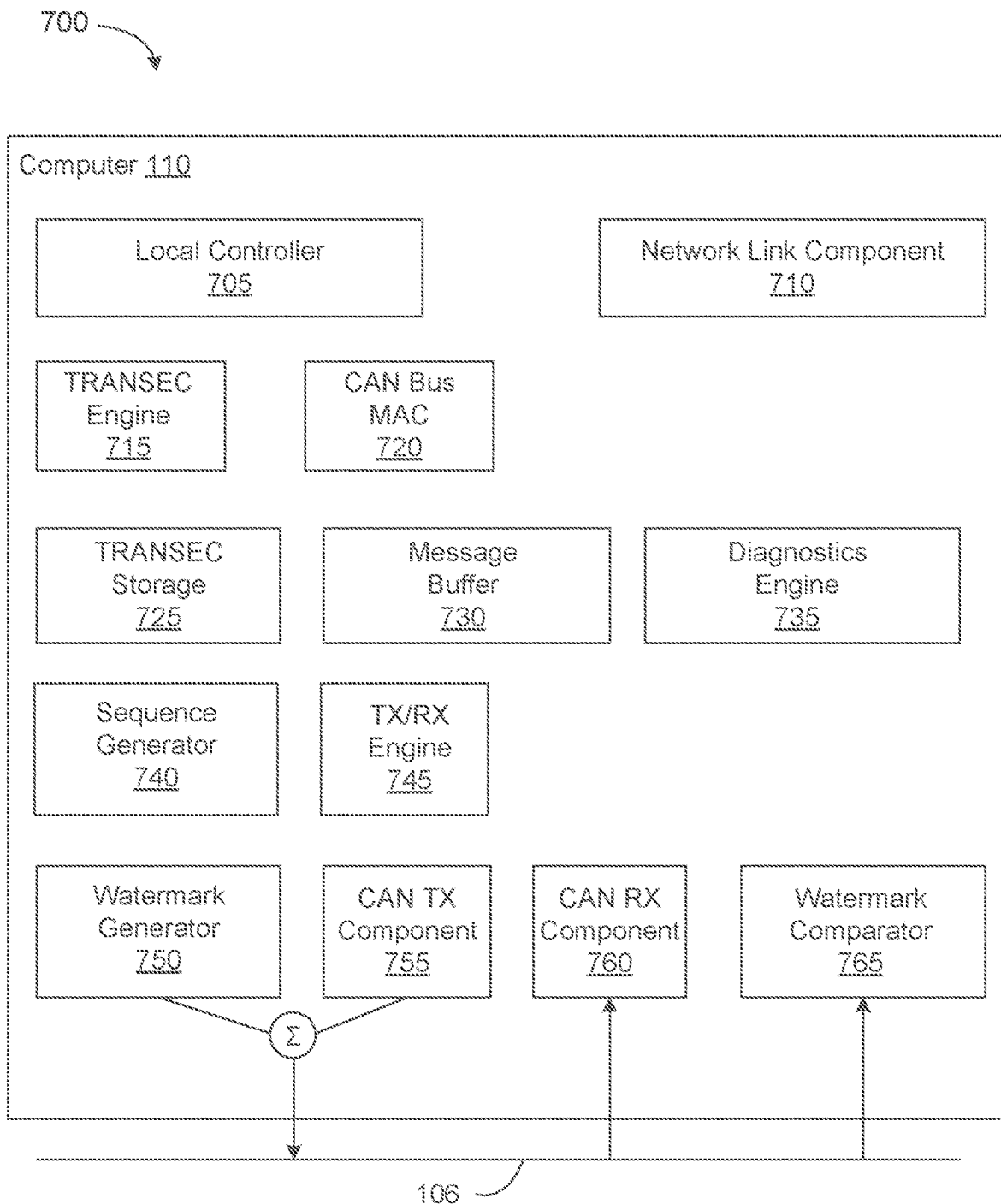
FIG. 7 is a block diagram of programming and/or hardware components of a vehicle computer utilized in watermarking of data communications.

As indicated in FIG. 3, first mode message generator 305 e.g., message buffer 730 of FIG. 7, operates to generate first mode message 315 for transmission along vehicle communications bus 106 utilizing a differential mode of operation. Second mode signal generator 310 may include a watermarking signal generator for transmission along vehicle communications bus 106. At a receiving end (not shown in FIG. 3) a received watermarking signal can be processed to determine whether the watermarking signal includes a predetermined watermarking signal. In response to the received watermarking signal including a predetermined watermarking signal, a data message can be authenticated. In response to the received watermarking signal not including a predetermined watermarking signal, the data message can be discarded as being false or illegitimate. In an example, an unauthenticated data message may be accepted by the receiver but later discarded in accordance with programming of a receiving computer 110, sensor 115, actuator 120, component 125, communications subsystem 130, and/or HMI 135.

Second mode signal 320 may include a spread-spectrum technique to modulate the signal as a watermark to authenticate first mode message 315. A spread-spectrum signal may utilize a spreading code having a code rate significantly higher than the data rate of first mode message 315. For example, as seen in FIG. 3, during the interval utilized to transmit a first binary value of first mode message 315 (i.e., during interval $T_3$), second mode signal generator 310 transmits 10 binary digits of a spreading code. Accordingly, as seen in FIG. 3, second mode signal 320 utilizes a spreading code having 10 times the data rate of first mode message 315 (e.g., $T_4=\frac{1}{10}T_3$). Thus, as shown in FIG. 3, a first binary value of first mode message 315 can be authenticated in response to binary values of the spreading code of second mode signal 320 having a threshold level of correlation (such as 80% correlation, 90% correlation, 95% correlation) with a predetermined spreading code stored at a receiving end of communications bus 106.

As mentioned in reference to FIG. 2, first mode message 315, which, in the example of FIGS. 2 and 3, utilizes a differential mode of transmission, does not make use of a return signal path. However, second mode signal 320, which utilizes a common mode of transmission to watermark first mode message 315, may make use of a return signal path. The return signal path may represent a vulnerability to electromagnetic interference conducted through the return signal path. Accordingly, responsive to a receiver at a receiving end of communications bus 106 detecting an increase in, for example, a bit-error-rate of second mode signal 320, second mode signal generator 310 may be directed to modify a spread ratio, which in this context, means a ratio of binary digits of a spreading code to a binary digit of first mode message 315. Thus, for example, responsive to a receiver at a receiving end of communications bus 106 detecting an increase in a bit-error-rate of second mode signal 320, second mode signal generator may decrease the spread ratio of second mode signal 320. In an example, responsive to conducted electromagnetic interference causing or contributing to an increase in a bit-error-rate of second mode signal 320, second mode signal generator 310 may decrease the spread ratio of second mode signal 320 by an integer factor, such as from 10 times the data rate of first mode message 315 to 5 times the data rate of the first mode message. In another example, responsive to a receiver at a receiving end of communications bus 106 detecting a decrease in bit-error-rate of second mode signal 320, second mode signal generator 310 may increase the spread ratio of second mode signal 320 e.g., by an integer factor, such as from 5 times the data rate of first mode message 315 to 10 times the data rate of first mode message 315.

Figure 4:
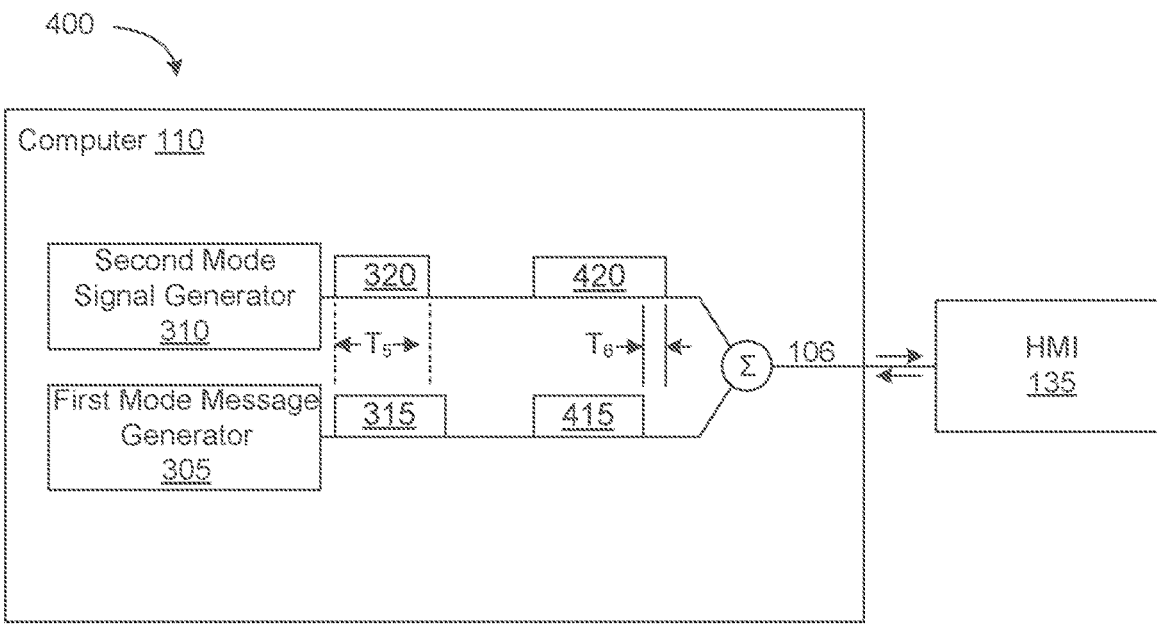

FIG. 4 is a diagram 400 showing vehicle computer 110 generating watermarking and data messages on communications bus 106. As shown in FIG. 4, vehicle computer 110 is in communication with HMI 135. Such communications may include relatively non-sensitive data, such as radio tuning parameters, climate control settings, etc. Such communications may also include sensitive or potentially sensitive content, such as codes utilized to access vehicle 105, names of persons authorized to operate vehicle 105 etc. Accordingly, computer 110 can dynamically adjust second mode signal 320 to provide an increased level of watermark authentication of first mode message 315. For example, responsive to an operator interacting with an infotainment display of vehicle 105, second mode signal generator 310 may utilize a relatively simple version of second mode signal 320 to watermark first mode message 315. In an example, such a signal may include a short string of binary ones followed by a short string of binary zeros. A relatively short string of binary ones may be transmitted exclusively during a portion of an interval during which first mode message 315 is transmitted, such as during interval $T_5$ as shown in FIG. 4. In another example, responsive to computer 110 transmitting potentially sensitive message 415, e.g., a username or password or other content relating to personally identifiable information, to be received by a component of HMI 135 for display to an operator of vehicle 105, computer 110 may utilize second mode signal 420, which may include a complex pattern of binary ones and zeros. Second mode signal 420 may extend beyond the interval during which potentially sensitive message 415 is transmitted, e.g., by time interval $T_6$. Accordingly, computer 110 can dynamically adjust the length and/or complexity of a second mode signal 320 that is used as a watermark to authenticate first mode message 315. Such dynamic adjustment in the length and/or complexity of second mode signal 320 may be based on a recipient of first mode message 315, a level of sensitivity (e.g., content) of data encoded in first mode message 315, or based on another criteria.

As described in reference to FIG. 4, second mode signal 420 may not be time-synchronized or time-coincident with transmission of a first message, e.g., potentially sensitive message 415, transmitted utilizing a first modulation mode. Thus, for example, second mode signal 420 could operate as a preamble that is transmitted prior to transmission of potentially sensitive message 415. In another example, second mode signal 420 can be transmitted after potentially sensitive message 415, so as to authenticate the potentially sensitive message. In another example, second mode signal 420 can be utilized to convey additional data, such as metadata, which may include parameters describing the source of potentially sensitive message 415, a credential of message 415, a length of message 415, etc.

Figure 5A:
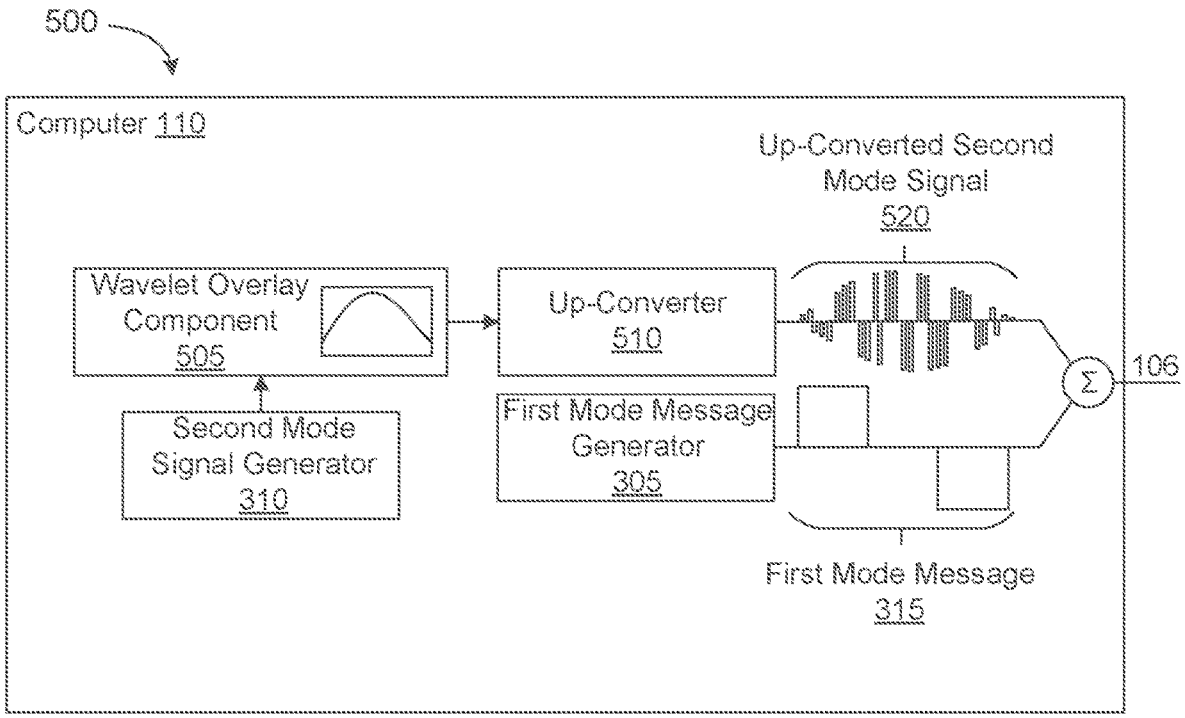
FIGS. 5A, and 5B are block diagrams of a vehicle computer capable of communicating watermarking signals and data messages via a communications bus.

FIG. 5A is a block diagram of a vehicle computer capable of communicating watermarking signals and data messages via a communications bus. As seen in FIG. 5A, programming of vehicle computer 110 can include wavelet overlay component 505, which operates to apply a wavelet algorithm to an input signal, such as an input from second mode signal generator 310. In the context of this disclosure, a wavelet means a wave-like oscillation of an input signal in either amplitude or phase during a time interval of and input signal. Accordingly, in the example of FIG. 5A, wavelet overlay component 505 applies a waveform that includes a portion of a sinewave oscillation in amplitude. In other examples, wavelet overlay component 505 can apply wavelet algorithms of different types, e.g., a cosine waveform, a trapezoidal waveform, a square waveform, etc., or another waveform type so as to adjust amplitudes over an interval of output signals from second mode signal generator 310. In an example, a wavelet overlay applied by wavelet overlay component 505, may be selected so as to provide isolation between the wavelet and content of a data message, e.g., first mode message 315, potentially sensitive message 415, etc.

Programming of computer 110 can further include programming to up-convert a second mode signal utilizing up-converter 510. In an example, a second mode signal that includes a spread spectrum signal utilizing a code rate of 1 Megabit/second can be up-converted e.g., by an integer or non-integer factor, to a code rate of 2 Megabits/second, 3 Megabits/second, 4 Megabits/second, etc. Thus, second mode signal 520 can be a watermark that has been up-converted and adjusted in amplitude over a time interval as a way of authenticating first mode message 315.

Figure 5B:
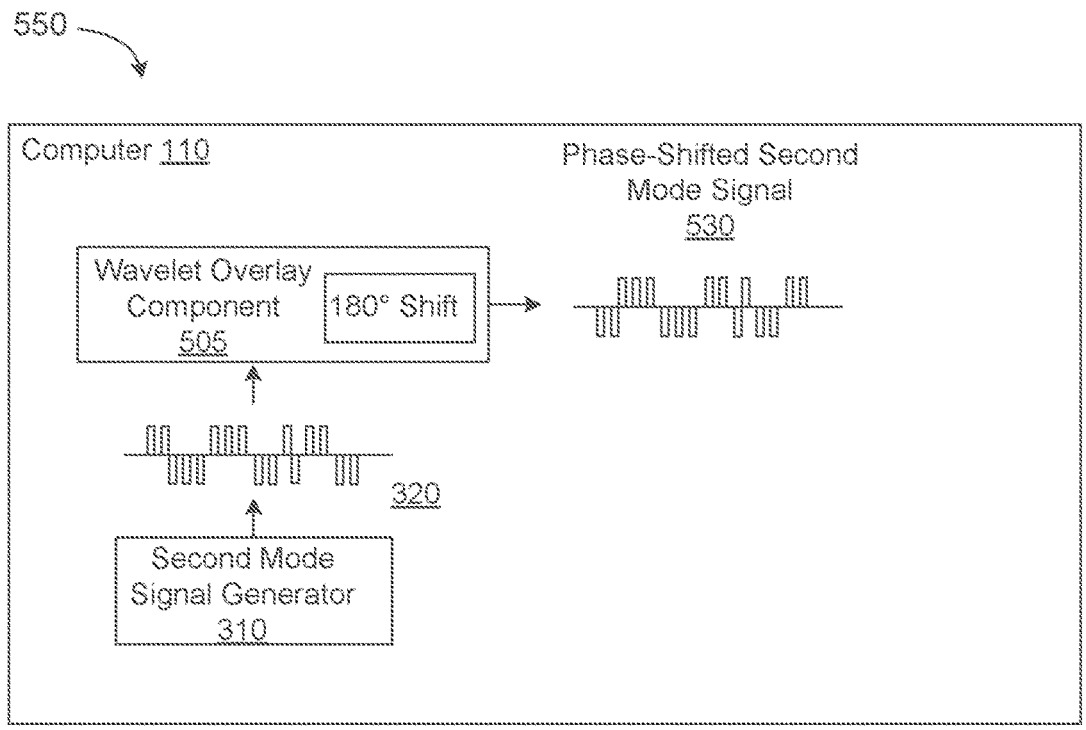

FIG. 5B is a block diagram of a vehicle computer capable of communicating watermarking signals and data signals via a communications bus. As seen in FIG. 5B, programming of vehicle computer 110 can include wavelet overlay component 505, which operates to apply a waveform brings about a 180° phase shift over an interval of an output signal from second mode signal generator 310. Accordingly, in the example of FIG. 5B, phase-shifted second mode signal 530 is an inverted version of second mode signal 320. In other examples, wavelet overlay component 505 can apply phase shifts other than 180°, such as 45° phase shifts, 90° phase shifts, or to apply any other phase shift over an interval of an output signal from second mode signal generator 310.

Figure 6:
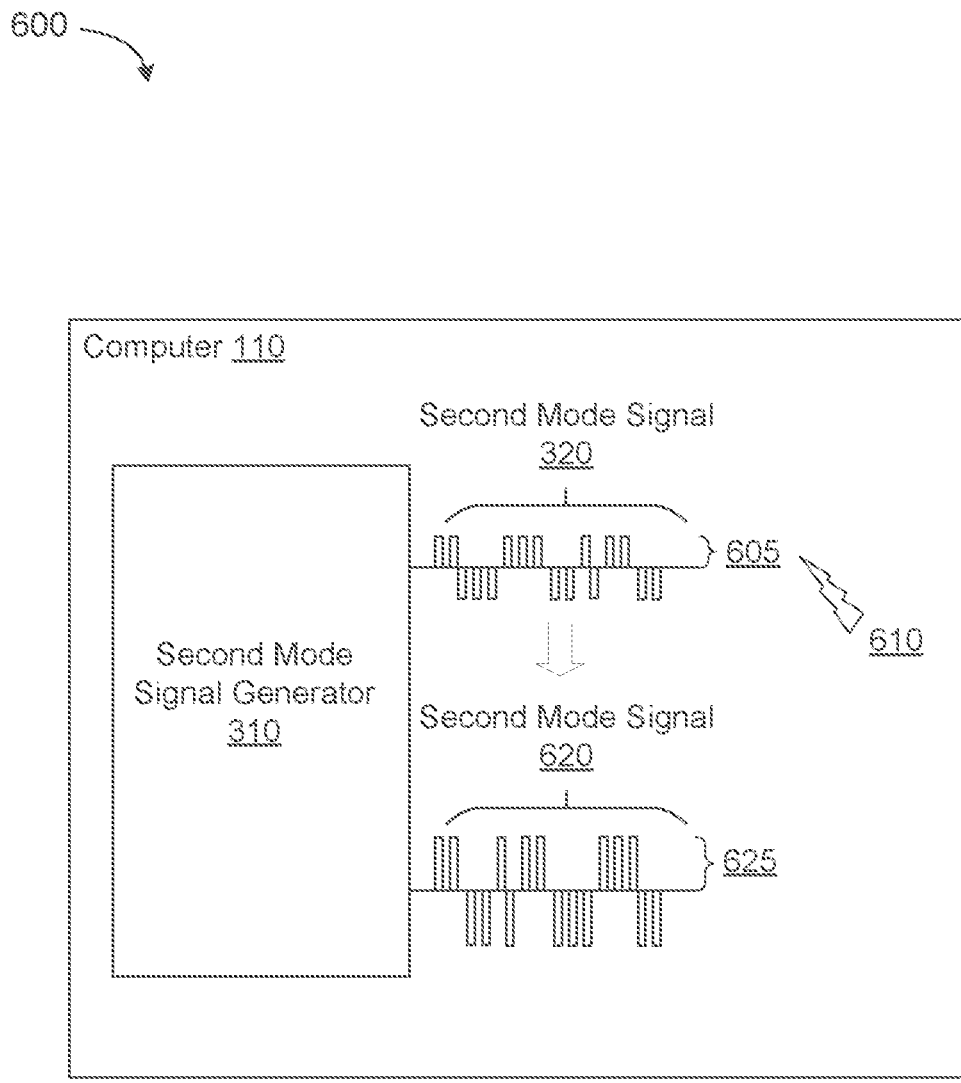
FIG. 6 is a block diagram of a vehicle computer capable of communicating watermarking signals in the presence of interference.

FIG. 6 is a block diagram of a vehicle computer capable of communicating watermarking signals and data messages over a communications bus. As previously indicated herein, second mode signal 320 may be modulated as a common mode signal applied to the conductors of vehicle communications bus 106. Further, and also as previously described, modulation of signals in a common mode may utilize a ground (e.g., floating ground, signal ground, chassis ground, etc.) which may provide a path for conducted electromagnetic interference. Accordingly, in response to a recipient of second mode signal 320 (e.g., sensors 115, actuators 120, components 125, communications subsystem 130, HMI 135, etc.) detecting an increase in bit-error-rate, or any other degradation in signal performance, vehicle computer 110 may increase the amplitude of second mode signal 320. Thus, as seen in FIG. 6, amplitude of second mode signal 620 may be increased from a first amplitude (e.g., amplitude 605) to a second amplitude (e.g., amplitude 625) so as to provide an output signal amplitude that overcomes electromagnetic interference source 610.

As described in reference to FIGS. 3, 4, 5A, 5B, and 6, a first mode message, e.g., 315, can be transmitted utilizing a differential mode (e.g., a first mode). The first mode message can be watermarked utilizing a second mode signal, e.g., 320, transmitted via a common mode (e.g., a second mode). A second message transmitted in a differential mode, e.g., 415, may be watermarked utilizing a second mode signal, e.g., 420, 520, 530, 620, having at least one parameter that is varied with respect to second mode signal 320. Thus, in an example, as described in reference to FIG. 3A, second mode signal, e.g., 320, may be varied so as to include a decreased spread ratio of a spread-spectrum signal. In another example, as described in reference to FIG. 4, second mode signal 420 may be varied with respect to second mode signal 320 so as to extend beyond an interval during which potentially sensitive second message 415 is transmitted. In another example, as described in reference to FIG. 5A, second mode signal 520 may be varied with respect to second mode signal 320 so as to include a wavelet overlay. In another example, also as described in reference to FIG. 5A, second mode signal 520 may be varied so as to be up-converted with respect to second mode signal, e.g., 320. In another example, as described in reference to FIG. 5B, second mode signal 530 may include a wavelet overlay, so as to be phase-shifted with respect to second mode signal 320. In another example, as described in reference to FIG. 6, second mode signal 620 may be varied so as to include an increased amplitude with respect to second mode signal 320.

FIG. 7 is a block diagram of programming and/or hardware components of a vehicle computer 110 utilized in watermarking data communications. In the example of FIG. 7, local controller 705 is a session-layer real-time controller that includes a set of programming operations to create, sequence, and modulate watermarking signals utilized to authenticate data messages. Network link component 710 is a network-layer component that controls network synchronization and network node management of vehicle communications bus 106. In the example of FIG. 7, network link component 710 receives a transmission security (TRANSEC) initial seed from transmission security engine 715. The transmission security seed includes an initial parameter, such as a pseudorandom number generator for a watermarking code, such as a spreading code, a spreading ratio, etc., which may be utilized to generate second mode signal 320 described in reference to FIG. 3. Accordingly, transmission security engine 715 controls and manages dynamic generation of watermarking codes, such as codes utilized to generate second mode signal 320 and second mode signal 420. Controller area network bus media access control (CAN Bus MAC) component 720 can be a legacy data-formatting medium access control layer, which includes logic for generating data messages, e.g., first mode message 315 of FIG. 3. In other examples, CAN Bus MAC component 720 can be utilized to generate another type of message, such as a message for use with a vehicle local interconnect network (LIN) bus, automotive ethernet, or any other multi-conductor bus structure suitable for transmitting messages modulated utilizing a differential mode (e.g., a first mode) with watermarking signals modulated utilizing a common mode (e.g., a second mode).

TRANSEC storage component 725 operates to store a present value for a watermarking code. Sequence generator 740 operates to generate the real time binary values, e.g., a spreading sequence, in accordance with a current watermarking code. Message buffer 730 operates as a buffer to store current data messages (e.g., first mode message 315) as well as any other messages currently in a queue for transmission along vehicle communications bus 106. Diagnostics engine 735 operates to assess whether any current second mode signals received by vehicle computer 110 include an increased level of noise and/or distortion, such as may be brought about by electromagnetic interference. Accordingly, diagnostics engine 735 may operate to determine whether a bit-error-rate (BER) of a spreading code, i.e., modulated via a common mode, has increased beyond a threshold value (e.g., 2%, 5%, 10%), etc. In this context, a threshold value may be selected based on any error control coding capability of a spreading code utilized to generate second mode signal 320. In response, diagnostics engine in 735 may signal local controller 705 to increase an amplitude of a second mode signal so as to overcome electromagnetic interference exhibited in common mode (e.g., first mode) transmissions.

Transmit/receive (TX/RX) engine 745 receives input signals from watermark comparator 765. Thus, transmit/receive engine 745 operates to determine whether a received message (e.g., first mode message 315) can be authenticated with a suitable watermark. Accordingly, based on output signals from watermark comparator 765, transmit/receive engine 745 determines whether to forward a message received from vehicle communications bus 106 has been authenticated or whether the received message is to be as discarded as inauthentic. Responsive to authentication of received messages, the messages can be forwarded to message buffer 730. Thus, watermark comparator 765 and controller area network receive (CAN RX) component 760 may operate simultaneously to receive messages from vehicle communications bus 106, in which CAN RX component 760 receives messages, e.g., first mode message 315, modulated via a differential mode (e.g., a first mode) and watermark comparator 765 receives messages transmitted via a common mode (e.g., a second mode). Similarly, watermark generator 750 may operate simultaneously with controller area network transmit (CAN TX) component 755. Thus, watermark generator 750 may modulate second mode signals 320, e.g., utilizing a common mode, simultaneously with CAN TX component 755 to modulate first mode messages, e.g., utilizing a differential mode.

Figure 8:
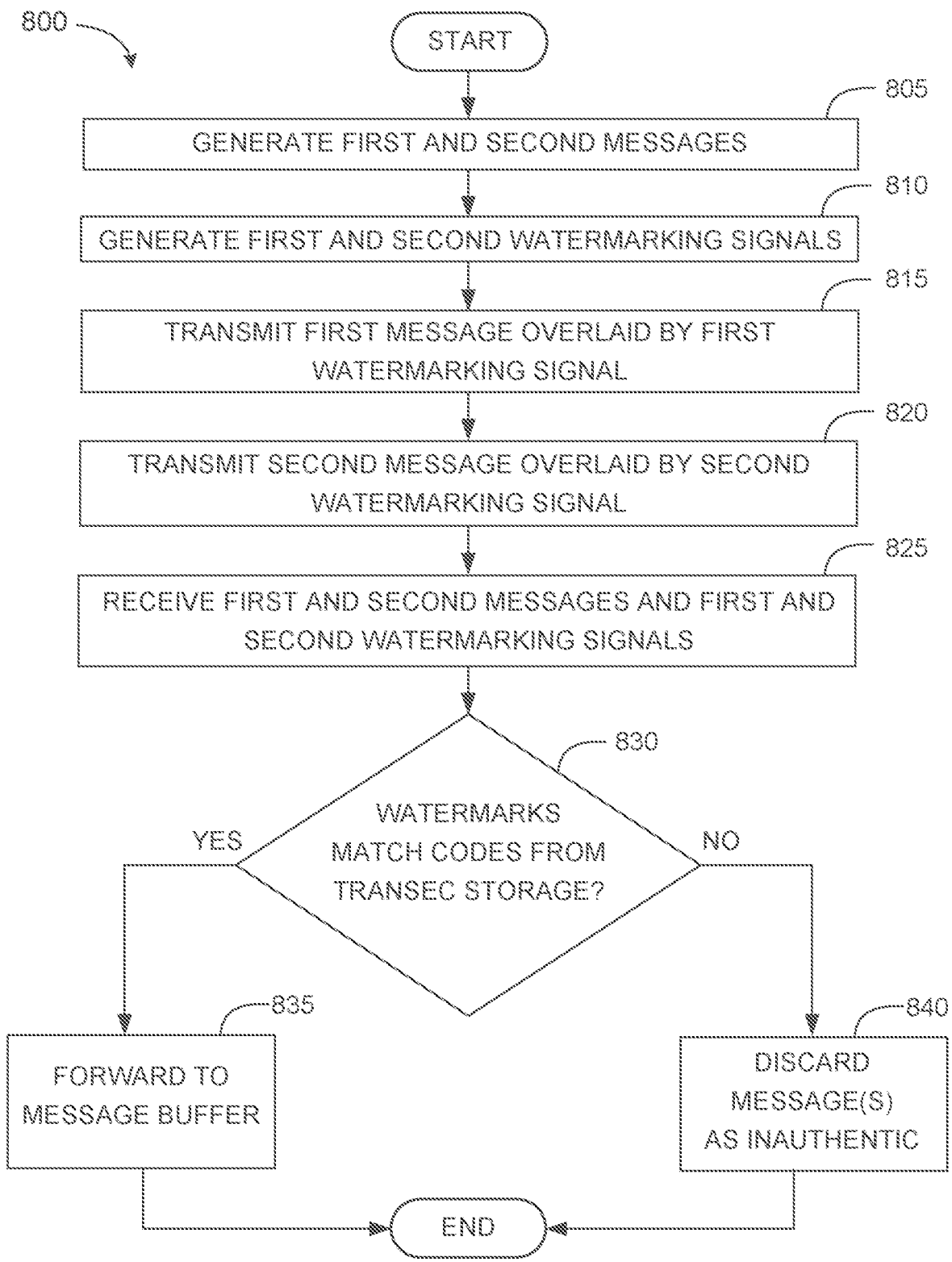
FIG. 8 is a diagram of an example process flow for transmitting and receiving watermarked vehicle data utilizing a communications bus.

FIG. 8 is a flow diagram of an example process 800 for transmitting and receiving watermarked vehicle data utilizing a vehicle communications bus. In some examples, the memory of vehicle computer 110 stores executable instructions for performing the blocks of process 800, and/or such programming could be implemented in other computing devices of vehicle system 100. Further, example process 800 can be utilized to provide watermark authentication of data messages in other applications such as those capable of utilizing a differential mode (a first mode) and a second mode (e.g., second mode). Thus, although process 800 is described as a vehicle-based process, in which a watermarking signal is transmitted as a way of authenticating a data message, it is to be understood that process 800 could be applied in the context of non-vehicle applications. Such non-vehicle applications may include, for example, security systems in which camera data, transferred to a controller and modulated utilizing a first mode, can be authenticated utilizing a second modulation mode. In other non-vehicle applications, sensor data that is modulated utilizing a first mode can be authenticated utilizing a second modulation mode.

As a general overview of vehicle-based process 800, vehicle computer 110, or a computer utilized in any other communications application, can receive sensitive or potentially sensitive data. Sensitive or potentially sensitive data may include personally identifiable information of a vehicle operator, data uploaded from an operator's or a passenger's mobile communications device, operator or passenger usernames utilized to gain entry to a vehicle, etc. Thus, vehicle computer 110 may determine whether a particular first mode message, e.g., 315, is to be watermarked, e.g., via second mode signal 320. Vehicle computer 110 may additionally determine whether a second message, e.g., first mode message 415, is to be watermarked utilizing a second mode signal, e.g., 420, having a parameter that varies with respect to second mode signal 320. A second mode signal may vary in accordance with a spreading code rate as described in reference to FIG. 3. The second mode signal may vary in accordance with an interval during which the second signal is transmitted, as described in reference to FIG. 4. The second mode signal may vary so as to be up-converted and/or overlaid with a wavelet, as described in reference to FIGS. 5A and 5B. The second most signal may vary so as to be increased in amplitude, as described in reference to FIG. 6. Watermarking of transmitted data may operate as a way of authenticating sensitive or potentially sensitive data. Watermarking of data communications can preclude insertion of false data, which could be used to gain illegitimate access to the vehicle, direct operations of the vehicle, or bring about disclosure of information that is private to operators and/or passengers of the vehicle. In such an environment, sensitive or potentially sensitive data messages are transmitted on a vehicle communications bus utilizing a differential (e.g., first) modulation mode. Messages modulated utilizing a first modulation mode are authenticated utilizing a watermarking signal modulated in a common (e.g., second) mode.

Process 800 begins at block 805, at which vehicle computer 110 generates first and second messages for transmission in a differential (first) mode. In an example, a first mode message may relate to an operation of vehicle 105 such as an input from one of sensors 115. A second message can include potentially sensitive data, such as personally identifiable data of an operator or passenger of vehicle 105.

Process 800 may continue at block 810, at which vehicle computer 110 generates first and second watermarking signals. A first watermarking signal may include binary digits transmitted exclusively during a portion of an interval during which first mode message 315 is transmitted, such as during time interval $T_5$ as described in reference to FIG. 4. A second watermarking signal, such as second mode signal 420, may include a more complex pattern of binary digits transmitted during an interval that extends beyond the interval during which, for example, potentially sensitive message 415 is transmitted, e.g., by time interval $T_6$. Alternatively, or in addition, second mode signal 420 may be up-converted and/or modified utilizing wavelet overlay component 505, which operates to modify an amplitude of second mode signal 320. Alternatively, or in addition, second mode signal 320 may be adjusted in phase over an interval of an output signal from second mode signal generator 310. Alternatively, or in addition, second mode signal 320 may be adjusted in amplitude so as to overcome conducted electromagnetic interference.

Process 800 may continue at block 815, at which vehicle computer 110 transmits first mode message 315 utilizing a differential (e.g., first) modulation mode. Block 815 can include the simultaneous transmission of second mode signal 320. Block 815 may utilize hardware and/or software components, such as watermark generator 750 and CAN TX component 755 described in reference to FIG. 7.

Process 800 may continue at block 820, at which vehicle computer 110 transmits a second message utilizing a differential modulation mode (e.g., potentially sensitive message 415). Similar to block 815, block 820 can include the simultaneous transmission of second mode signal 420 utilizing watermark generator 750 and CAN TX component 755 described in reference to FIG. 7.

Process 800 may continue at block 825, at which a receiver, which may include sensor 115, actuator 120, component 125, communications subsystem 130, or HMI 135, receives first mode message 315 and potentially sensitive message 415 as well as first and second mode signals 320, 420. Reception of first mode message 315 and potentially sensitive message 415 and first and second mode signals (320, 420) may utilize hardware and/or software components, such as CAN RX component 760 and watermark comparator 765 described in reference to FIG. 7.

Process 800 may continue at block 830, at which a receiver, e.g., sensor 115, actuator 120, etc., performs a comparison to determine whether received first and second mode signals (320, 420) matches or at least correlates with (e.g., 85% correlation, 90% correlation, 95% correlation, etc.) with watermark code stored within TRANSEC storage component 725.

Process 800 may continue at block 835, in which in response to matching or threshold correlation, at block 830, between received first and second mode signals (320, 420) and watermark codes stored in TRANSEC storage component 725, messages may be forwarded to message buffer 730.

Process 800 may alternatively continue at block 840, in which in response to absence of matching or a threshold correlation between received second mode signal (320) and a watermark code stored within TRANSEC storage component 725, first mode message 315 may be discarded. Block 840 may additionally include, responsive to absence of matching or a threshold correlation between received second mode signal 420 and a watermark code stored within TRANSEC storage component 725, potentially sensitive message 415 may be discarded.

After block 835 or 840, process 800 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry. Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It should further be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
a computer including a processor coupled to a memory, the memory storing instructions executable by the processor to:
generate first and second messages for transmission via a communications bus via a first binary voltage modulation mode;
generate first and second watermarking signals for transmission on the communications bus via a second binary voltage modulation mode, wherein the first and second binary voltage modulation modes are isolated from each other;
transmit the first message overlaid by the first watermarking signal; and
transmit the second message overlaid by the second watermarking signal, the second watermarking signal having a parameter that varies from the first watermarking signal and based on detected noise on a conductor of the communications bus.

2. The system of claim 1, wherein the first binary voltage modulation mode includes a differential mode.

3. The system of claim 1, wherein the second binary voltage modulation mode includes a common mode.

4. The system of claim 1, wherein the first and second watermarking signals are modulated via a spread-spectrum technique.

5. The system of claim 1, wherein the parameter is based on a ratio of a spreading code rate to a data rate of a binary voltage spread-spectrum signal.

6. The system of claim 1, wherein the parameter is an integer value of a ratio of a spreading code rate to a data rate of a spread-spectrum signal.

7. The system of claim 1, wherein the parameter is a phase shift of a spreading code of a spread-spectrum signal.

8. The system of claim 1, wherein the parameter is a length of the second watermarking signal.

9. The system of claim 1, wherein the parameter is a code rate of a spread-spectrum signal.

10. The system of claim 1, wherein the parameter is an up-conversion factor of a spreading code of a spread-spectrum signal.

11. The system of claim 1, wherein the parameter is a voltage amplitude of a spreading code of a spread-spectrum signal.

12. The system of claim 1, wherein the instructions are further to:
determine the parameter based on content of the second message.

13. The system of claim 1, wherein the instructions are further to:
determine the parameter based on a recipient of the second message.

14. The system of claim 1, wherein the first or the second watermarking signals extend beyond an interval during which the first message or the second message are transmitted.

15. The system of claim 1, wherein the first or the second watermarking signals terminate prior to completion of transmission of the first message of the second message.

16. A method comprising:
generating first and second messages for transmission via a communications bus via a first binary voltage modulation mode;
generating first and second watermarking signals for transmission on the communications bus via a second binary voltage modulation mode, wherein the first and second binary voltage modulation modes are isolated from each other;
transmitting the first message overlaid by the first watermarking signal; and
transmitting the second message overlaid by the second watermarking signal, the second watermarking signal having a parameter that varies from the first watermarking signal and based on detected noise on a conductor of the communications bus.

17. The method of claim 16, further comprising:
detecting interference on one or more conductors of the communications bus; and
determining the parameter of the second watermarking signal based on the detected interference.

18. The method of claim 16, further comprising:
determining a recipient of the second message; and
determining the parameter of the second watermarking signal based on the determined recipient.

19. The method of claim 16, further comprising:
determining a message content of the second message; and
determining the parameter of the second watermarking signal based on the determined second message content.

\* \* \* \* \*